(12) United States Patent
Onouchi et al.

(10) Patent No.: US 7,525,064 B2
(45) Date of Patent: Apr. 28, 2009

(54) METHOD OF FORMING A FLUX LAYER ON AN ALUMINUM PLATE MEMBER

(75) Inventors: Koji Onouchi, Gamagori (JP); Shouei Teshima, Handa (JP); Ichiro Taninaka, Kakogawa (JP)

(73) Assignees: Denso Corporation, Kariya (JP); Harima Chemicals, Inc., Kakogawa (JP)

( * ) Notice: Subject to any disclaimer, the term of this patent is extended or adjusted under 35 U.S.C. 154(b) by 398 days.

(21) Appl. No.: 11/287,714

(22) Filed: Nov. 28, 2005

(65) Prior Publication Data

US 2006/0113355 A1    Jun. 1, 2006

(30) Foreign Application Priority Data

Dec. 1, 2004    (JP)    ............... 2004-349040

(51) Int. Cl.
*B23K 1/00*    (2006.01)
*B23P 15/26*    (2006.01)

(52) U.S. Cl. .............. 219/85.1; 219/603; 228/205; 228/223; 29/890.03

(58) Field of Classification Search ............... 219/603, 219/615, 85.1–85.22; 228/205–207, 223; 29/890.03, 890.032, 890.045
See application file for complete search history.

(56) References Cited

U.S. PATENT DOCUMENTS

| | | | | |
|---|---|---|---|---|
| 6,036,083 | A | * | 3/2000 | Luo et al. .................... 228/223 |
| 6,105,850 | A | * | 8/2000 | Lauzon et al. ............... 228/207 |
| 6,234,381 | B1 | | 5/2001 | Hasegawa et al. |
| 6,371,360 | B1 | | 4/2002 | Maus et al. |
| 6,555,172 | B2 | | 4/2003 | Kimura et al. |
| 2004/0009358 | A1 | | 1/2004 | Scott et al. |

FOREIGN PATENT DOCUMENTS

| | | |
|---|---|---|
| EP | 0 758 937 | 2/1997 |
| EP | 1 029 630 | 8/2000 |
| EP | 1 287 941 | 3/2003 |
| JP | 11-123588 | 5/1999 |
| JP | 2000-153393 | 6/2000 |
| JP | 2002-66731 | 3/2002 |

OTHER PUBLICATIONS

Office action dated Oct. 15, 2007 in German Application No. 05 056 863.7 with English translation.

* cited by examiner

*Primary Examiner*—Philip H Leung
(74) *Attorney, Agent, or Firm*—Harness, Dickey & Pierce, PLC

(57) ABSTRACT

The purpose of the present invention is provide a method of forming a flux layer on an aluminum plate member, wherein a heating step for drying after a spray-coating of a flux composition can be omitted.

The invention relates to a flux layer 2 composed of solid constituents of 5-25 $g/m^2$ formed on a surface of an aluminum plate member 1, by spray-coating a flux composition from a nozzle 20 to the plate member 1 with a thickness of 0.2-1.6 mm, which was press-molded and heated for degreasing in a heat-degreasing oven 10, while a temperature of the plate member 1 is kept from 120 to 180° C. under the remaining heat after completing a heating step for degreasing, and naturally drying for volatilizing volatile constituents of the flux composition utilizing the remaining heat.

10 Claims, 2 Drawing Sheets

METHOD OF FORMING A FLUX LAYER ON AN ALUMINUM PLATE MEMBER

BACKGROUND OF THE INVENTION

1. Field of the Invention

The present invention relates to a method of forming a flux layer on an aluminum plate member, a flux composition to be used in the forming method, and an aluminum plate member on which a flux layer was formed. The present invention is effective, in particular, for applying it to form the flux layer on the plate member constituting a heat exchanger made of aluminum.

2. Description of the Related Art

Conventional methods include a method of forming a flux layer for brazing on a surface of an aluminum alloy work disclosed in Japanese unexamined patent publication No. 2002-66731. In the forming method, a liquid containing a flux and a binder is spray-coated on a heated work, and then a flux layer is formed on a surface of the work after a drying step of drying with heat.

Although a step of heating the work is employed before spray-coating the liquid in the conventional method of forming the flux layer for brazing, a heat-drying step of heating and drying the work is necessary after the spray-coating step. Therefore, the conventional method has problems of taking long time for processing the work, as well as making steps complicated and upsizing of facilities.

SUMMARY OF THE INVENTION

Inventors of the present invention focused their attention a step of degreasing that is employed before a step of forming a flux layer, and an aluminum plate member (made of an aluminum material or an aluminum alloy material) is heated to a relatively high temperature at the step of degreasing, when a relatively large amount of a processing oil associated with processes of pressing and the like is adhered on the aluminum plate member.

The inventors thought that if it could be completed to dry a spray-coated flux composition by using the remaining heat of the heating step for degreasing before the spray-coating step, it becomes unnecessary to carry out heating and drying the plate member after spray-coating.

Then, they studied earnestly, and found that a good flux layer for brazing can be formed on the surface of the aluminum plate member, without preparing a heat-drying step after a step of spray-coating the flux composition, if a temperature of the plate member at a spray-coating period after the heating step, an amount of the flux composition coated at the spray-coating step and so on are desirably combined.

The present invention, which was conceived considering the above-mentioned viewpoints, has a purpose of providing a method of forming a flux layer on an aluminum plate member which can remove a heating step for drying after a spray-coating step, a flux composition to be used for the forming method, and an aluminum plate member on which the flux layer was formed.

In order to achieve the above purpose, the present invention provides a method of forming a flux layer on an aluminum plate member, comprising a heating step of heating the aluminum plate member for degreasing, and a coating step of spray-coating a flux composition composed of solid constituents comprising a flux and a binder, and volatile constituents other than the solid constituents, which dissolve or disperse the solid constituents, on the plate member after the heating step, wherein the plate member has a thickness of 0.2-1.6 mm, and in the coating step, the flux composition is spray-coated while a temperature of the plate member is in a range of 120-180° C. under remaining heat after the heating step, and the volatile constituents are volatilized to form the flux layer composed of the solid constituents of 5-25 g/m$^2$ on a surface of the plate member.

The present invention also provides a flux composition composed of a solid constituents comprising a flux and a binder, and volatile constituents other than the solid constituents, which dissolve or disperse the solid constituents, and the concentration of the solid constituents is from 30 to 50% by weight in total.

The present invention also provides an aluminum plate member, wherein a thickness of the plate member is from 0.2 to 1.6 mm, a flux composition composed of solid constituents comprising a flux and a binder, and volatile constituents other than the solid constituents, which dissolve or disperse the solid constituents, was spray-coated while a temperature of the plate member was in a range of 120-180° C. under remaining heat after heating for degreasing, and a flux layer composed of the solid constituents of 5-25 g/m$^2$ was formed on a surface of the plate member by volatilizing the volatile constituents.

DETAILED DESCRIPTION OF THE INVENTION

Figure 1:
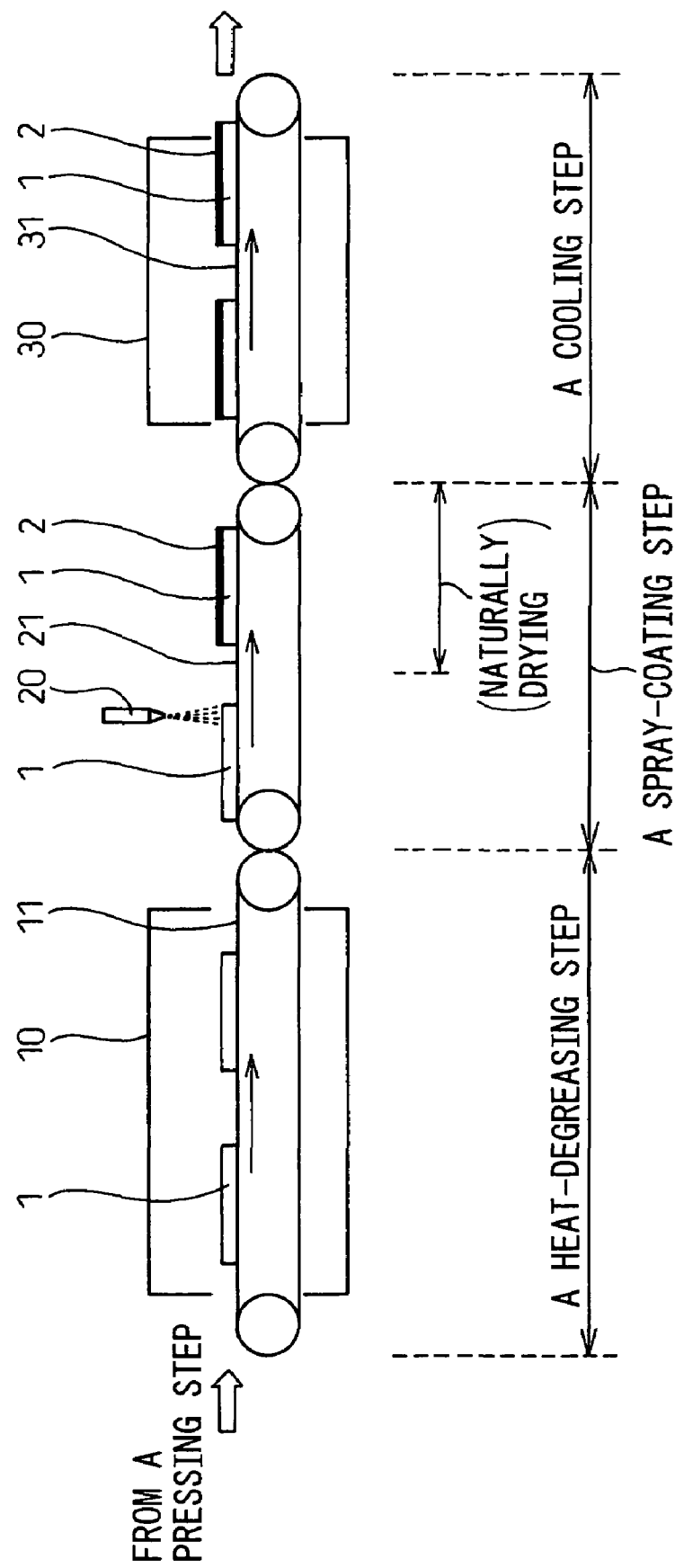
FIG. 1 is a schematic drawing to illustrate steps for forming a flux layer for brazing on a surface of an aluminum plate member in one example embodiment according to the present invention.

The present invention provides a method of forming a flux layer on an aluminum plate member, comprising a heating step of heating an aluminum plate member for degreasing, and an coating step of spray-coating a flux composition composed of solid constituents comprising a flux and a binder, and volatile constituents other than the solid constituents, which dissolve or disperse the solid constituents, on the plate member after the heating step, characterized by that the plate member has a thickness of 0.2-1.6 mm, and in the coating step, the flux composition is spray-coated while a temperature of the plate member is in a range of 120-180° C. under remaining heat after the heating step, and the volatile constituents are volatilized to form the flux layer composed of the solid constituents of 5-25 g/m$^2$ on a surface of the plate member (claim 1).

According to a method of forming a flux layer on an aluminum plate member of the above present invention, the flux layer composed of the solid constituents can be formed on the surface of the aluminum plate member, by volatilizing the volatile constituents in the spray-coated flux composition via the remaining heat which the aluminum plate member has.

In other words, a good flux layer can be formed on the surface of the aluminum plate member, by naturally drying the flux composition through use of the remaining heat after completing the heating step for degreasing, without preparing any particular step of drying with heat after the coating step of spray-coating the flux composition. Thus, it is possible to remove the heating step for drying after the step of spray-coating.

Herein, if the thickness of the aluminum plate member is less than 0.2 mm, it is difficult due to insufficient heat capacity to complete naturally drying via the remaining heat. It is not preferable that aluminum plate member has a thickness more than 1.6 mm, as the amount of heat at the heating step becomes large.

It is not preferable that the temperature of the plate member at the spray-coating period is lower than 120° C., as it takes long time by natural drying. It also is not preferable that the temperature is above 180° C., as the rate of volatilizing the volatile constituents is too high, and repelling of the flux composition and nonuniformities of coating easily occur.

Additionally, if the flux layer formed with the solid constituents of the flux composition on the surface of the aluminum plate member, associated with naturally drying, is less than 5 g/m$^2$, it is difficult to achieve a good brazing at a brazing period. It also is not preferable that the flux layer is more than 25 g/m$^2$, as flux residues easily occur, and rising costs result.

A method of forming a flux layer according to the present invention is characterized by forming the flux layer composed of the solid constituents in the range of 10-20 g/m$^2$ on the surface of the plate member at the coating step (claim 2).

This method is more preferable from the viewpoints of brazing properties at the brazing period, preventing the flux residue from occurring, and reducing the cost.

A method of forming a flux layer according to the present invention is characterized by that the flux composition to be spray-coated at the coating step contains the solid constituents in the range of 30-50% by weight in total (claim 3).

It is not preferable that the content of the solid constituents is less than 30% by weight, as the amount of the volatile constituents is large, and it is difficult to complete naturally drying by the remaining heat. It also is not preferable that the content of the solid constituents is beyond 50% by weight, as it is difficult to employ an easy-to-use method of air-spraying at low pressure.

Therefore, according to the above invention, it is possible to spray-coat the flux composition by using an easy-to-use spraying method, and complete natural drying by surely volatilizing the volatile constituents by the remaining heat.

A method of forming a flux layer according to the present invention is characterized by that the volatile constituents are composed of alcohol which is water soluble, volatile, and has a flash point of not lower that 30° C., and water, and the ratio by weight of the alcohol to the water is 0.05-3.5 (claim 4).

It is not preferable that the ratio by weight of the alcohol to the water is less than 0.05, as the aluminum plate member easily repels the flux composition, and easily results in non-uniformities. Further, the ratio is not preferable, since the flux in the flux composition is easily separated and settled. On the other hand, it also is not preferable that the ratio by weight of the alcohol to the water is more than 3.5, as the volatile constituents easily has flammability.

Therefore, according to the above invention, it is possible to prevent the flux from separating and settling, as well as to reduce repelling of the flux composition. Further, it is easy to prevent the flux composition from igniting.

As the method of forming a flux layer according to the invention, a concrete example of the alcohol can be 3-methoxy-3-methyl-1-butanol (claim 5).

The method of forming a flux layer according to the invention is characterized by that the binder in the solid constituents of the flux composition is composed of an acrylic resin, and the ratio by weight between the flux and the acrylic resin is from 8.5:1.5 to 9.5:0.5 (claim 6).

It is not preferable that the acrylic resin is more than 8.5:1.5 in the ratio by weight between the flux and the acrylic resin, as it is difficult to achieve a good brazing in a brazing period. It also is not preferable that the acrylic resin is less than 9.5:0.5 in the ratio by weight between the flux and the acrylic resin, as an adhesion of the formed flux layer to the aluminum plate member easily decreases.

Therefore, according to the above invention, it is possible to form the flux layer with excellent adhesion properties, which can result in a good brazing, on the surface of the aluminum plate member.

The flux composition according to the invention is characterized in that the flux composition is composed of solid constituents comprising a flux and a binder, and volatile constituents other than the solid constituents, which dissolve or disperse the solid constituents, and the concentration of the solid constituents is 30-50% by weight in total (claim 7).

When such a flux composition is used, it is possible to carry out the method of forming the flux layer according to the invention described in claim 3.

The flux composition according to the invention is characterized in that the volatile constituents are composed of alcohol which is water soluble, volatile, and has a flash point of not lower than 30° C., and water, and the ratio by weight of the alcohol to the water is from 0.05 to 3.5 (claim 8).

When such a flux composition is used, it is possible to carry out the method of forming the flux layer according to the invention described in claim 4.

As the flux composition according to the invention, 3-methoxy-3-methyl-1-butanol can be employed as a concrete example of the alcohol in the volatile constituents (claim 9).

The flux composition according to the invention is characterized by that the binder in the solid constituents is composed of an acrylic resin, and the ratio by weight between the flux and the acrylic resin is from 8.5:1.5 to 9.5:0.5 (claim 10).

When such a flux composition is used, it is possible to carry out the method of forming the flux layer according to the invention described in claim 6.

The aluminum plate member according to the invention is characterized in that a thickness of the plate member is 0.2-1.6 mm, a flux composition composed of solid constituents comprising a flux and a binder, and volatile constituents other than the solid constituents, which dissolve or disperse the solid constituents, was spray-coated while a temperature of the plate member was in a range of 120-180° C. under remaining heat after heating for degreasing, and the flux layer composed of the solid constituents of 5-25 g/m$^2$ was formed on a surface of the plate member by volatilizing the volatile constituents (claim 11).

The aluminum plate member, on which such a flux layer was formed, can be obtained by the method of forming the flux layer described in claim 1.

The aluminum plate member according to the invention is characterized by that the flux layer composed of the solid constituents of 10-20 g/m$^2$ was formed on the surface of the plate member (claim 12).

The aluminum plate member, on which such a flux layer was formed, can be obtained by the method of forming the flux layer described in claim 2.

The aluminum plate member according to the invention is characterized by that a thickness of the plate member is 0.2-1.6 mm, a flux composition according to any of claims 7-10 was spray-coated while a temperature of the plate member was in a range of 120-180° C. under remaining heat after heating for degreasing, and the flux layer composed of the solid constituents of 5-25 g/m² was formed on a surface of the plate member by volatilizing the volatile constituents (claim 13).

The aluminum plate member according to the invention is characterized by that the flux layer composed of the solid constituents of 10-20 g/m² was formed on the surface of the plate member (claim 14).

The aluminum plate member, on which any of these flux layers was formed, can be obtained by the method of forming the flux layer described in any of claims 3-6.

EXAMPLES

Example embodiments of the present invention are illustrated as follows, based on the drawings.

Figure 2:
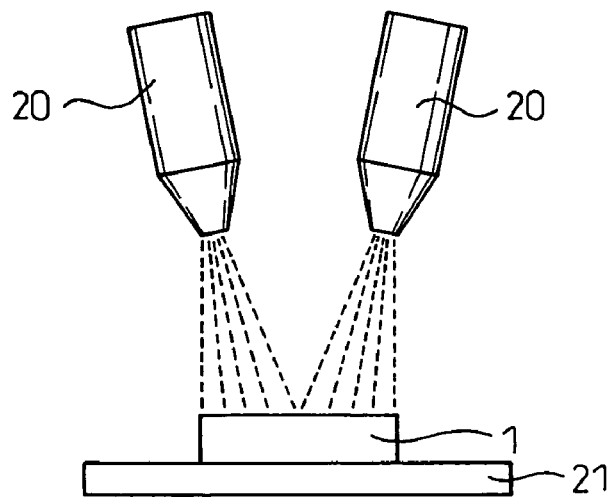
FIG. 2 is an enlarged drawing of a main part in order to illustrate spray-coating of a flux composition.
Figure 3:
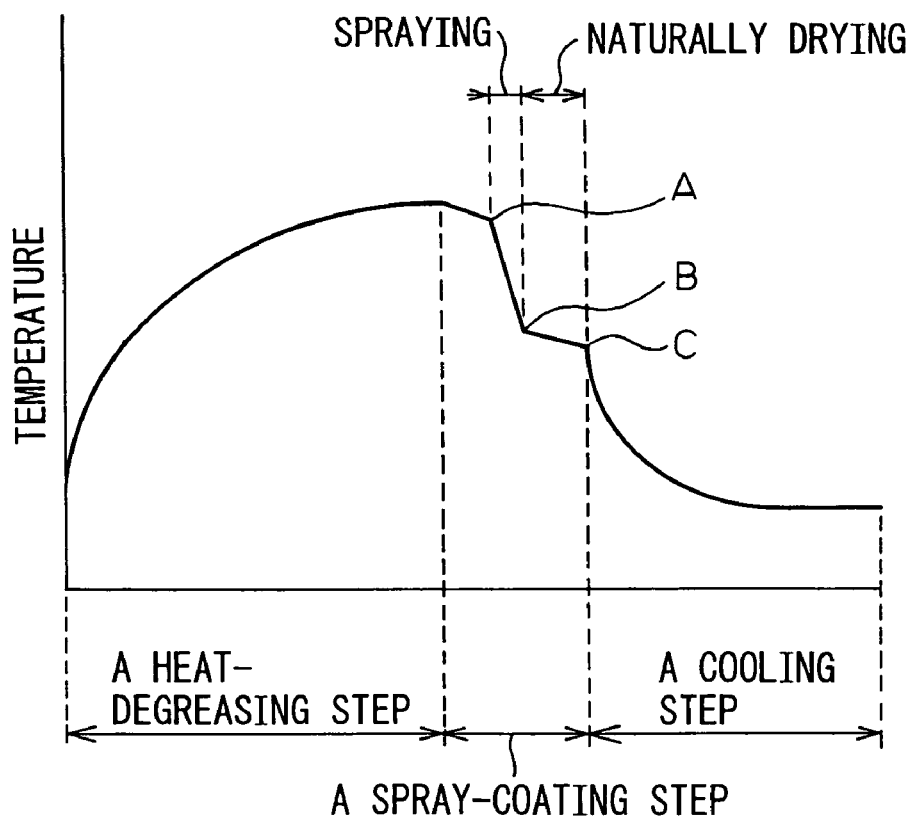
FIG. 3 is a graph showing a change of a temperature of an aluminum plate member at each step.

FIG. 1 is a drawing of a schematic diagram which shows steps for forming a flux layer for brazing on the surface of an aluminum plate member (made of an aluminum material or an aluminum alloy) in this example embodiment. FIG. 2 is an enlarged drawing of a main part in order to illustrate spray-coating of a flux composition. FIG. 3 is a graph showing a temperature of the aluminum plate member at each step.

An aluminum plate member 1 of this example embodiment (referred to as "a plate member" hereafter) is a member for constructing flow channels of a heat transfer medium in a heat exchanger made of aluminum. It is mutually brazed by being combined with other structural members, and is structured to construct heat exchanger.

As shown in FIG. 1, the plate member 1 (with the thickness of about 0.8 mm in this example) is pressed into a desired shape, and then processed to successively pass through a heat-degreasing step to heat and degrease a press-working oil (the heating step in this example embodiment), a spray-coating step to spray-coat the flux composition and form a flux layer 2 for brazing on the surface of the plate member 1 (the coating step in this example embodiment), and a cooling step to cool the plate member on which the flux layer 2 was formed.

In the heat-degreasing step, the plate member 1 is placed on a mesh belt conveyer 11, and carried in a heat-degreasing oven 10. At this period, the plate member 1 is heated by a heated air introduced into the heat-degreasing oven 10 (heated to about 150° C. in this example embodiment), and the press-working oil adhered on the surface at a previous press-processing step is heated and removed.

The plate member 1 degreased at the heat-degreasing step is immediately moved to the spray-coating step, placed on a roller or a chain conveyer 21 (the chain conveyer in this example embodiment), and carried. At the upper position of the chain conveyer 21, nozzles 20 are arranged as shown in FIG. 1, and spray the flux composition toward the carried plate member 1.

In this example embodiment, a low-pressure air spray method (for example, a method of spraying at air pressure of 0.01-0.5 MPa) is employed from the standpoints of safety and cost.

The flux composition sprayed from the nozzles 20 in this example embodiment is a mixture of the flux (a fluoride of potassium and aluminum such as $KAlF_4$ in this example) of 35% by weight, a binder (an acrylic resin in this example) of 4% by weight, an alcohol (3-methoxy-3-methyl-1-butanol in this example) of 46% by weight and water of 15% by weight.

The alcohol and the water described above are volatile constituents volatilizing after spraying, and the flux and the binder are solid constituents forming the flux layer 2 on the surface of the plate member 1 after the volatile constituents were volatilized. In the flux composition in this example embodiment, the flux in a form of micro particles disperses in a mixed solution of the alcohol and the water, and the acrylic resin as the binder is dissolved in the mixed solution of the alcohol and the water.

The alcohol, which has both of water solubility and volatility, and the flash point of which is not lower than 30° C., is preferable. Alcohols, for example, disclosed in Japanese Unexamined Patent Publication No. 2000-153393 can be used.

Acrylic resins, for example, disclosed in Japanese Unexamined Patent Publication No. 11-123588, can be used as the binder.

As FIG. 2 shows a spraying portion as a view to the direction of carrying the plate member 1 (a view from the left side of FIG. 1), plural nozzles 20 (two nozzles in this example) are installed side by side to the direction of the width of the plate member (in the rectangular direction to the direction of carrying the plate member). They are arranged to uniformly spray-coat the above-described flux composition on the upper surface of the plate member. In this example, the amount of the flux composition coated on the upper surface of the plate member is corresponding to the amount of the uniformly-coated solid constituents of about 15 g/m².

The plate member 1 spray-coated with the flux composition is naturally dried while it is carried at the chain conveyer 21 in the period of the spray-coating step (dried without any heating step).

As a change of the temperature of the plate member 1 is shown in FIG. 3, when spray-coating of the flux composition is started (at Point A shown in FIG. 3), the temperature of the plate member 1 heated at the heating step for degreasing is about 150° C. by a remaining heat.

The flux composition is spray-coated and, then, the volatile constituents in the flux composition start to volatilize at the surface of the plate member 1 by the remaining heat of the plate member 1, and the temperature decreases to about 120° C. due to the heat of vaporization (leading to Point B shown in FIG. 3). Then, the plate member 1 passed through the spraying zone is naturally dried by the remaining heat remained in the plate member 1, and completes volatilizing the volatile constituents in the flux composition to form the flux layer 2 consisting of only the solid constituents in the flux composition.

The chain conveyer 21 carries the plate member 1 at the rate of about 50 m/min. One point on the plate member passes, within about 0.1 second, through the zone for spraying the flux composition from the nozzles 20, and then it is naturally dried in about 2 seconds (leading to Point C shown in FIG. 3).

At the spray-coating step, the plate member 1 with the surface on which the flux layer 2 was formed by naturally drying the flux composition is immediately carried to a cooling step.

At the cooling step, the plate member 1 on which the flux layer 2 was formed is placed on the mesh belt conveyer 31, and carried through in a cooling furnace 30. At this period, the plate member 1 is cooled down to a temperature, where it can be handled, by a cooling air (air at the normal temperature or at the room temperature) introduced into the cooling furnace 30.

Although the thickness of the plate member 1 was about 0.8 mm in the above-described example, the thickness is preferably from 0.2 to 1.6 mm.

It is not preferable that the thickness of the plate member 1 is less than 0.2 mm, as the heat capacity of the plate member 1 is insufficient, and it is difficult to complete naturally drying by the remaining heat. It also is not preferable that the thickness of the plate member 1 is more than 1.6 mm, since the amount of heat at the heating step for degreasing becomes too large, and a weight of a heat exchanger including the plate member 1 as a structural component increases.

The temperature of the plate member 1 at the period for spray-coating the flux composition (the temperature corresponding to from Point A to Point B shown in FIG. 3) is preferably in the range of 120-180° C.

It is not preferable that the temperature of the plate member 1 at the period for spray-coating is less than 120° C., as it takes long period until completing naturally drying due to the temperature close to the boiling point of water in the volatile constituents, and the productivity decreases. It also is not preferable that the temperature of the plate member 1 at the period for spray-coating is above 180° C., as it becomes higher than the boiling point of 3-methoxy-3-methyl-1-butanol (176° C.), the volatilizing rate of the volatile constituents is too high, and repelling of the flux composition and nonuniformities of coating easily occur.

For the reasons described above, in order to volatilize stably and quickly the volatile constituents in the flux composition, the temperature of the plate member 1 at the period for spray-coating the flux composition is more preferably in the range of 140-160° C.

An amount of the spray-coated flux composition is preferably from 5 to 25 g/m$^2$ as the amount of solid constituents (the amount of the flux layer 2).

It is not preferable that the amount of the flux layer 2 is less than 5 g/m$^2$, as it is difficult to carry out a good brazing in a brazing period. It also is not preferable that the amount of the flux layer 2 is above 25 g/m$^2$, since flux residues easily occur at the brazing period, and the costs increase.

For the reasons described above, in order to achieve both brazing properties and preventing malfunctions such as flux residues from occurring, the amount of the spray-coated flux composition is more preferably from 10 to 20 g/m$^2$ as the amount of solid constituents.

The concentration of the solid constituents in the flux composition (the ratio of the weight occupied by the flux and the acrylic resin, such as 39% by weight in the above-described example) is preferably from 30 to 50% by weight.

It is not preferable that the concentration of the solid constituents is less than 30% by weight in total, as the amount of the volatile constituents becomes great, and it becomes difficult to complete naturally drying by the remaining heat. It also is not preferable that the concentration of the solid constituents is above 50% by weight, as it is difficult to employ an easy-to-use method of air-spraying at low pressure. If the composition including micro particles of the flux is sprayed by an air-less method, a malfunction regarding sealing durability of pump portions easily occurs. Although, there are a method of using an air-sprayer for high viscosity and a method of coating under high pressure, they also are not preferable, as the facilities are complicated and expensive.

For the reasons described above, in order to obtain both of drying properties and spray-processing properties, the concentration of the solid constituents in the flux composition is more preferably from 35 to 45% by weight in total.

The ratio by weight of the alcohol to the water in the volatile constituents of the flux composition (about 3.1 in the above-described example) is preferably from 0.05 to 3.5.

If the ratio by weight of the alcohol to the water is less than 0.05, the plate member 1 easily repels the flux composition, and it is difficult to uniformly form the flux layer 2. Further, it is not preferable that the ratio of the water becomes large, as the flux in the flux composition is easily precipitated. On the other hand, it also is not preferable that the ratio by weight of the alcohol (3-methoxy-3-methyl-1-butanol) to the water is above 3.5, as a flash point appears.

For the reasons described above, in order to achieve both of forming a uniform flux layer and preventing a flash point from occurring, the ratio by weight of the alcohol to the water in the volatile constituents of the flux composition is more preferably from 1.0 to 3.2.

For the solid constituents of the flux composition, the ratio by weight between the flux and the acrylic resin is preferably from 8.5:1.5 to 9.5:0.5 (about 9:1 in the above-described example).

It is not preferable that the acrylic resin content in the ratio by weight between the flux and the acrylic resin is greater than 8.5:1.5, as it would be difficult to carry out a good brazing in a brazing period. It also is not preferable that the acrylic resin content in the ratio by weight between the flux and the acrylic resin is less than 9.5:0.5, as the adhesion of the formed flux layer 2 to the plate member 1 decreases.

For the reasons described above, in order to obtain both of the brazing properties and the adhesion properties of the flux layer, it is most preferable that the ratio by weight between the flux and the acrylic resin is 9:1.

According to the flux composition and the method of forming the flux layer described above, the volatile constituents in the flux composition spray-coated on the plate member 1 at the spray-coating step can be volatilized by the remaining heat included in the plate member 1 to form the flux layer 2 composed of the solid constituents of the flux composition on the surface of the plate member 1.

In other words, a good flux layer 2 can be formed, on the surface of the plate member 1, by naturally drying the flux composition by utilizing the remaining heat after completing the heating step for degreasing, without preparing a heating step for drying after the spray-coating step. Therefore, the heat-drying step after the spray-coating step can be omitted.

ANOTHER EXAMPLE EMBODIMENT

Although the remaining heat at the heating step for degreasing carried out just before the spray-coating step was utilized in order to dry the flux composition spray-coated on the plate member 1 in the example embodiment described above, a step carried out before the spray-coating step may be any heating step of heating for degreasing the plate member.

For example, a previous step before the spray-coating step is a heating step for drying solvent components which were used to remove oil from the plate member, and may be a step of naturally drying the flux composition spray-coated at the spray-coating step by utilizing the remaining heat of this heating step.

Although two nozzles 20 were used for spraying the flux composition at the spray-coating step in the example embodiment described above, the number of the nozzles may be 1 or not less than 3 according to the shape and the number of the plate members.

Further, although the plate member 1 was a plate member made from an aluminum material or an aluminum alloy material in the example embodiment described above, the present invention can be effectively applied to any plate member on the surface of which a brazing material was previously cladded.

What is claimed is:

1. A method of forming a flux layer on an aluminum plate member, the method comprising
heating the aluminum plate member to degrease the aluminum plate member, stopping the heating step;

cooling the aluminum plate member to room temperature immediately after the stopping step;

spray-coating a flux composition comprising a flux and a binder, and other constituents other than the flux and the binder on the aluminum plate member after the stopping step and during the cooling step, drying the flux composition on the plate member during the cooling step;

wherein the aluminum plate member has a thickness of 0.2-16 mm, and the flux composition is spray-coated on the aluminum plate member while a temperature of the plate aluminum member is in a range of 120-180° C., and the other constituents are volatilized to form the flux layer composed of the flux and the binder of 5-25 g/m² on a surface of the aluminum plate member during the cooling step.

2. A method of forming a flux layer on an aluminum plate member according to claim 1, wherein the flux layer composed of the flux and the binder of 10-20 g/m² is formed on the surface of the aluminum plate member.

3. A method of forming a flux layer on an aluminum plate member according to claim 1, wherein the flux composition contains the flux and the binder in a range of 30-50% by weight in total.

4. A method of forming a flux layer on an aluminum plate member according to claim 1, wherein the other constituents are composed of alcohol which is water soluble and has a flash point of not lower than 30° C., and water, and a ratio by weight of the alcohol to the water is from 0.05 to 3.5.

5. A method of forming a flux layer on an aluminum plate member according to claim 4, wherein the alcohol is 3-methoxy-3-methyl-1-butanol.

6. A method of forming a flux layer on an aluminum plate member according to claim 1, wherein the binder is composed of an acrylic resin, and the ratio by weight between the flux and the acrylic resin is from 8.5:1.5 to 9.5:0.5.

7. A method of manufacturing a heat exchanger, the method comprising:

providing a plate member;

pressing the plate member into a desired shape to construct a flow channel of the heat exchanger;

heating the plate member to degrease the plate member after the pressing step;

stopping the heating step;

cooling the plate member to room temperature;

spray-coating a flux composition comprising a flux, a binder and other constituents other than the flux and the binder on the plate member after the stopping step and prior to the cooling step;

drying the flux composition on the plate member during the cooling step;

brazing the flux-coated plate member with other structural members to construct the heat exchanger after the cooling step; wherein:

the plate member has a thickness of 0.2-1.6 mm, the flux composition is spray-coated on the plate member in the spray-coating step immediately after the heating step, while a temperature of the plate member is kept in a range of 120-180° C. and the other constituents are volatilized to form the flux layer composed of the flux and the binder at an amount of 10-20 g/m² on a surface of the plate member, and the other constituents comprise alcohol which is water soluble and has a flash point of not lower than 30° C., and water, a ratio by weight of the alcohol to the water is from 0.05 to 3.5.

8. A method of manufacturing a heat exchanger according to claim 7, wherein the flux composition coating step contains the flux and the binder in the range of 30-50% by weight in total.

9. A method of manufacturing a heat exchanger according to claim 7, wherein the alcohol is 3-methoxy-3-methyl-1-butanol.

10. A method of manufacturing a heat exchanger according to claim 7, wherein the binder is composed of an acrylic resin, and the ratio by weight between the flux and the acrylic resin is from 8.5:1.5 to 9.5:0.5.

* * * * *

UNITED STATES PATENT AND TRADEMARK OFFICE
CERTIFICATE OF CORRECTION

PATENT NO.         : 7,525,064 B2                                              Page 1 of 1
APPLICATION NO.    : 11/287714
DATED              : April 28, 2009
INVENTOR(S)        : Koji Onouchi et al.

It is certified that error appears in the above-identified patent and that said Letters Patent is hereby corrected as shown below:

Title Page, (75) Inventors: "Shouei Teshima"
    should be -- Shoei Teshima --

Col. 9, line 11, claim 1, "0.2-16mm"
    should be -- 0.2-1.6mm --

Signed and Sealed this

First Day of September, 2009

David J. Kappos
*Director of the United States Patent and Trademark Office*